United States Patent
Reilly

(10) Patent No.: US 6,766,584 B1
(45) Date of Patent: Jul. 27, 2004

(54) ANGLE SETTING AND MEASUREMENT GAGE

(76) Inventor: Paul J. Reilly, 560 N. Moorpark Rd. No. 150, Thousand Oaks, CA (US) 91360

(*) Notice: Subject to any disclaimer, the term of this patent is extended or adjusted under 35 U.S.C. 154(b) by 0 days.

(21) Appl. No.: 10/277,209

(22) Filed: Oct. 22, 2002

(51) Int. Cl.7 .................................................. G01B 3/56
(52) U.S. Cl. .............................. 33/534; 33/464; 33/626; 33/538; 33/501.5
(58) Field of Search ......................... 33/640, 452, 464, 33/482, 534, 538, 626, 628, 633, 641, 562, 563, 566, 542, 375, 501.05, 501.08, 501.5

(56) References Cited

U.S. PATENT DOCUMENTS

| | | | | |
|---|---|---|---|---|
| 980,340 A | * | 1/1911 | Roch et al. .................... 33/464 |
| 2,527,753 A | * | 10/1950 | Oslund ......................... 342/123 |
| 2,645,858 A | * | 7/1953 | Davis ............................ 33/368 |
| 3,252,223 A | * | 5/1966 | Gettel ........................... 33/534 |
| 3,568,739 A | * | 3/1971 | Kirk ............................. 83/471.2 |
| 3,958,339 A | * | 5/1976 | Thornell ....................... 33/640 |
| 4,974,330 A | * | 12/1990 | Covert ......................... 33/474 |
| 4,976,046 A | * | 12/1990 | Lee et al. ..................... 33/640 |
| 5,611,149 A | * | 3/1997 | Fujiwara ...................... 33/833 |

* cited by examiner

Primary Examiner—Christopher W. Fulton
Assistant Examiner—Travis Reis
(74) Attorney, Agent, or Firm—Allen A. Dicke, Jr.

(57) ABSTRACT

The gage has a body made of flat plate which has a reference edge. Another edge is a gage edge which is angular and defines a sharp apex away from the gage edge. A foot is slidable along the gage edge to rotate the gage body around the sharp apex pivot. Indicia indicate the angle at different foot positions.

15 Claims, 1 Drawing Sheet

US 6,766,584 B1

ANGLE SETTING AND MEASUREMENT GAGE

FIELD OF THE INVENTION

This invention is directed to an angle setting and measurement gage, which is a 2-piece structure which can be set to accurately define and measure angles and particularly small angles.

BACKGROUND OF THE INVENTION

In the trades and crafts, such as metal working and wood working, it becomes necessary to set two parts in a very accurate angular position. Existing protractors do not have the required accuracy. At present, one manner in which precise angles are set is to employ precision angular gage blocks. The artisan must stack many of these dedicated angular blocks together to achieve the desired angles. Another method is to use sine bars. These very precise bars are used in conjunction with linear gage blocks. The artisan is required to employ trigonometric calculations to achieve the desired angle of the sine bar. Either of these methods of measuring or setting an angle becomes very time-consuming. In addition, the accurate gage blocks required are quite expensive. The same kind of system is used in both the setting of the angle and the measuring of an existing angle. The measurement works in the opposite manner, with the assembly of accurate gage bars to the angle presented by existing parts. Either the setting of an angle or measuring an angle is time-consuming by employing the present-day gage blocks.

It is helpful to provide a gage which can be easily used to set an angle or measure the angle between existing parts, with the angle measurement being done with great accuracy, even at small angles.

SUMMARY OF THE INVENTION

In order to aid in the understanding of this invention, it can be stated in essentially summary form that it is directed to an angle setting and measurement gage which has a body which is conveniently configured as a flat plate. The body has a reference edge and a base edge. The base edge has an apex which serves as a contact pivot on a supporting surface. A foot of known height is positioned under the base edge away from the apex to define a triangle. The height of the foot defines the opposite side; the distance from the apex to the top of the foot along the base edge defines the hypotenuse; while the distance from the apex to the bottom of the foot along the supporting surface defines the adjacent. Thus, the positioning of the foot along the base edge controls the angle of the reference edge with respect to the supporting surface. The body may have several reference edges, which have a known fixed angle with respect to each other.

It is, thus, a purpose and advantage of this invention to provide an angle setting and measurement gage which is economic of construction, easy to use and which can accurately set and measure angles.

It is another purpose and advantage of this invention to provide an angle setting and measurement gage which is of simple construction so that it can be accurately manufactured to provide accuracy in the gage.

It is another purpose and advantage of this invention to provide an angle setting and measurement gage which is particularly useful in setting small angles on a scroll saw or table saw.

Other purposes and advantages of this invention will be noted from the study of the following portion of the preferred embodiment and the attached claims.

DESCRIPTION OF THE PREFERRED EMBODIMENT

Figure 1:
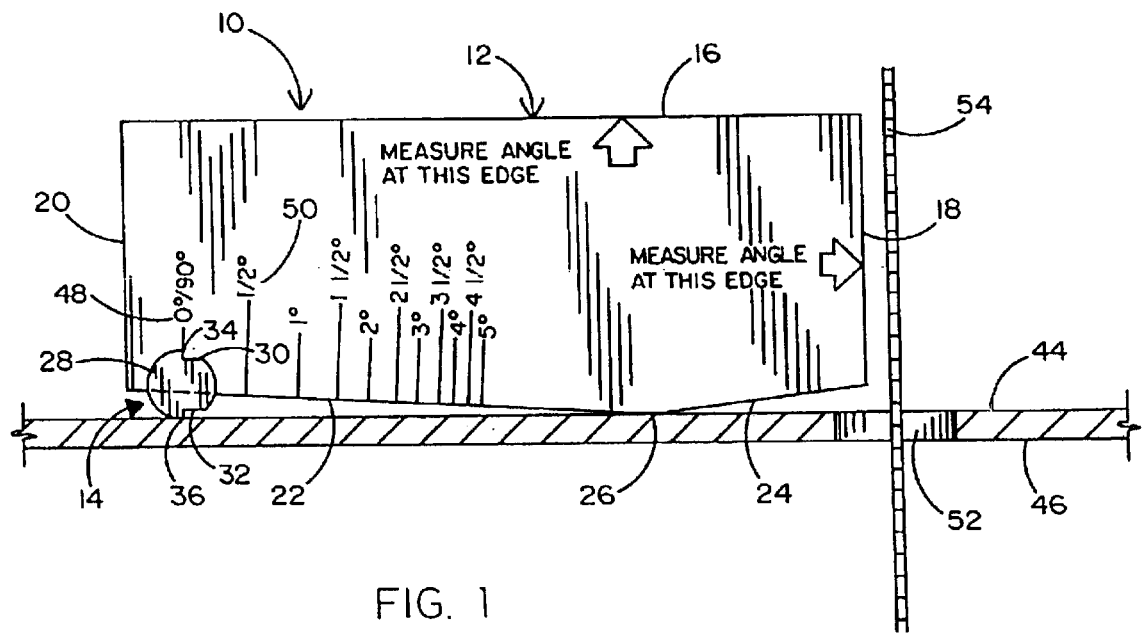
FIG. 1 is a side-elevational view of the angle setting and measurement gage of this invention, shown employed on a scroll saw, the table of which is taken in section.
Figure 2:
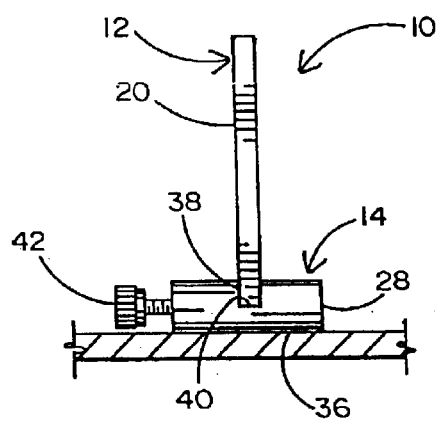
FIG. 2 is a left end view thereof.

The gage 10, seen in FIGS. 1 and 2, comprises a body 12 and a foot 14. The body 12 can be made of metal or polymer (plastic) plate of substantially uniform thickness. It has a top reference edge 16 and end reference edge 18. In the preferred embodiment, these two reference edges are at a right angle with respect to each other. The back edge 20 may be a reference edge, in which case it is preferably parallel to the end reference edge 18. The bottom edge of the plate has a gage edge 22 and a clearance edge 24. Between them is a sharp apex 26.

The foot 14 is a rod initially formed as a right circular cylinder 28, and it is machined with two flats 30 and 32. The top flat defines an indicator point 34. The bottom flat 32 defines a contact point 36. As seen in FIG. 2, the foot 14 has a notch 38 therein into which the gage edge of the body 12 is engaged. The notch 38 has a bottom 40 which is a known distance above the contact point 36. Clamp screw 42 is threaded into the end of the circular cylinder 28 and enters into the notch 38 so that tightening the screw clamps the foot surface 40 onto the bottom edge of the body. Since the foot 14 is long in the lateral direction of the body 12, the gage has 3-point support that ensures stability when the gage is placed on the flat top surface 44 of saw table 46.

The foot 14 has a particular dimension between its contact point 36 and the bottom 40 of the notch, which is the "opposite" side of the triangle. Thus, when the foot is placed at a particular position along the length of the gage edge 22, the top reference edge 16 is parallel to the top surface 44 of the table. At this point, there is a zero indicia 48 on the body. The indicator point 34 serves as a witness line to indicate when the foot is properly positioned for the zero angle position. Since the end reference surface 18 is at a right angle to the top reference surface 16, the end reference surface 18 is at a right angle with respect to the top surface 44 of the table.

The foot can be unclamped from the zero position and moved toward the apex 26. This raises the left end of the body 12. Through trigonometry, knowing the height of the notch bottom 40 above the contact point 36 (the "opposite" side) and knowing the distance from the sharp apex 26 to the indicator point 34 (the "adjacent" side), other angles can be calculated. For example, one-half degree indicia at witness line 50 is shown. Additional increasing angle notations, each with their corresponding witness line are shown. The increasing angle notations are shown positioned toward the sharp apex 26. By placing the foot at a particular position along the gage edge 22, a specific angle can be established between the surface 44 upon which the gage rests and the end reference surface 18. This is particularly useful for setting and/or measuring saw blade angles with respect to the table surface.

The table 46 has a saw opening 52 therein through which saw blade 54 extends. The saw blade 54 may be a internal combustion engine air flow system scroll saw blade, a jigsaw blade, a band saw blade, or a table saw blade. In the absence of the hole 52, the blade may be a radial arm saw blade or a chop saw blade. Since there is a hole 52 in the surface 44, the sharp apex 26 is set back from the end reference edge 18. Thus, when the end reference surface 18 lies against the blade 54, the apex 26 still rests on the table top surface. If a particular saw blade angle is desired, the foot 14 is placed with its indicator point 34 at the witness line corresponding to the desired angle. This places the reference edges 16 and 18 at that angle. The end reference surface 18 is brought close to the saw blade 54 and the saw blade is adjusted with respect to the reference surface to be parallel to the end reference edge 18. In this way, accurate angular positioning of the saw blade 54 with respect to the top surface 44 of the table is achieved. In measuring, the end reference edge 18 is placed against the saw blade, and the foot is moved along the length of gage edge 22 until the end reference edge 18 is parallel to the saw blade. The position of the foot 18 then indicates the angle of the saw blade with respect to the surface 44.

The gage 10 may be used for other angle setting and measurement. The top reference edge 16 is at a right angle to the end reference edge 18, and thus can be employed for setting and measurement. Furthermore, triangles can be placed against reference edges 16 or 18 to add or subtract from the angles indicated by the indicia.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An angle setting and measurement gage comprising;
   a body, said body having a reference edge, a gage edge and a clearance edge, said clearance edge intersecting said reference edge, said gage edge intersecting said clearance edge at a sharp apex which can engage upon a surface and about which said body can rock; and
   a foot separate from said share apex movably mounted on said gage edge, said foot extending transversely from said body to provide three point support said body on said foot and said apex, said foot being movably mounted for movement along said gage edge to rotate said body around said apex to position said reference edge at a selected angle with respect to a line between said foot and said share apex.

2. The gage of claim 1 wherein there is indicia on said body to indicate the position of said foot to position said gage edge at a predetermined angle.

3. The gage of claim 2 where there are first and second reference edges on said body, said first and second reference edges being positioned at a known angle with respect to each other so that two angles can be established by setting said foot at a particular position on said gage edge.

4. The gage of claim 3 wherein said first and second reference edges are at a right angle with respect to each other.

5. An angle setting and measurement gage comprising:
   a body, said body having an end reference edge on a first edge of said body and having a gage edge and a clearance edge on a second edge of said body, a sharp apex, said sharp apex being positioned intermediate the length of said second edge of said body at the intersection of said gage edge and said clearance edge, said apex separating said gage edge from said clearance edge so that said body can be supported on a surface and rotated around said sharp apex; and
   a foot, said foot extending transversely to said body to support said body, said foot engaging said gage edge of said body, said foot having a contact point which is a known dimension between said contact point and said gage edge so that the position of said foot along the length of said gage edge controls the angle of rocking of said body on said sharp apex on the supporting surface.

6. The gage of claim 5 further including indicia on said body so that by positioning said foot with respect to said indicia a particular angle of said reference edge can be established with respect to the supporting surface.

7. The gage of claim 6 wherein said foot is sufficiently long in a direction transverse to said body to provide standup support for said body on the supporting surface.

8. The gage of claim 7 wherein said foot has a notch therein to embrace said gage edge of said body, said notch having a bottom so that when the distance between said bottom of said notch and said contact point is known and the distance from said sharp apex is known, the angle of said gage with respect to a supporting surface can be trigonometrically calculated.

9. The gage of claim 8 wherein there is a plurality of indicia on said body, said indicia being positioned so that when said foot is set at a particular indicia, the angle of said reference surface with respect to the supporting surface is indicated.

10. The gage of claim 9 further including a clamp to clamp said foot at a selected position along said gage edge.

11. The gage of claim 10 wherein said clamp has a clamp screw threaded into said foot, said clamp screw being positioned to engage on and clamp said foot with respect to said body.

12. The gage of claim 11 wherein said foot has an indicator point thereon to relate to indicia on said body to indicate the regular setting to which the gage is set.

13. The gage of claim 9 wherein said foot has an indicator point thereon to relate to indicia on said body to indicate the regular setting to which the gage is set.

14. The gage of claim 5 wherein said body has first and second reference edges, said first and second reference edges being at a known angle with respect to each other so that separate known angles are established by a position of said foot on said gage edge.

15. The gage of claim 14 wherein said sharp apex and said foot are engaged on the top surface of a saw table and said reference surface is positioned to set the angle of the saw table with respect to a saw blade.

\* \* \* \* \*